(12) United States Patent
Hiron

(10) Patent No.: US 7,886,654 B2
(45) Date of Patent: Feb. 15, 2011

(54) FILTER HOLDER FOR A DOSETTE AND COFFEEMAKER COMPRISING SUCH A FILTER HOLDER

(75) Inventor: Frederic Hiron, Asse le Boisne (FR)

(73) Assignee: SEB S.A., Ecully (FR)

( * ) Notice: Subject to any disclaimer, the term of this patent is extended or adjusted under 35 U.S.C. 154(b) by 688 days.

(21) Appl. No.: 11/919,120

(22) PCT Filed: Apr. 12, 2006

(86) PCT No.: PCT/FR2006/000855
§ 371 (c)(1),
(2), (4) Date: Oct. 24, 2007

(87) PCT Pub. No.: WO2006/120312
PCT Pub. Date: Nov. 16, 2006

(65) Prior Publication Data
US 2009/0308257 A1 Dec. 17, 2009

(30) Foreign Application Priority Data
May 4, 2005 (FR) .................................. 05 04581

(51) Int. Cl.
*A47J 31/06* (2006.01)
(52) U.S. Cl. .......................................... 99/295; 99/323
(58) Field of Classification Search ................... 99/295, 99/302 R, 306, 307, 323
See application file for complete search history.

(56) References Cited

U.S. PATENT DOCUMENTS

| | | | | |
|---|---|---|---|---|
| 2,899,886 | A | * | 8/1959 | Rodth ........................... 99/295 |
| 3,908,530 | A | | 9/1975 | Simon, Jr. et al. |
| 4,429,623 | A | | 2/1984 | Illy |
| 4,660,466 | A | * | 4/1987 | Fries et al. ..................... 99/294 |
| 4,697,503 | A | * | 10/1987 | Okabe et al. ................... 99/306 |
| 4,921,712 | A | * | 5/1990 | Malmquist .................... 464/77 |
| 5,326,472 | A | * | 7/1994 | Combe ........................ 210/455 |
| 7,322,274 | B2 | * | 1/2008 | Wang ........................... 99/280 |

FOREIGN PATENT DOCUMENTS

BE 775 481 A2 3/1972

\* cited by examiner

*Primary Examiner*—Reginald L Alexander
(74) *Attorney, Agent, or Firm*—Young & Thompson

(57) ABSTRACT

A filter holder for a coffee machine is used for receiving a pod with an infusible product and includes a cup (2) having a bottom (3) provided with a discharge orifice (19) and an annular wall (4) extending to a top circumference (5) defining an opening which is mountable on a hot water outlet, and a pod support (10) which extends between the annular wall (4) of the cup at a distance from the bottom (3) and is provided with perforations (7, 8). At least one perforation (7) which is embodied in the form of an elongated slot extends on the plane of the support (10) and has a thickness which enables the infusion to freely flow. The filter holder (1) is particularly suitable for a coffee machine producing a low-pressure hot water.

11 Claims, 2 Drawing Sheets

FILTER HOLDER FOR A DOSETTE AND COFFEEMAKER COMPRISING SUCH A FILTER HOLDER

This invention relates to a filter holder for a coffeemaker, designed to house a dosette of the product to be infused. More particularly, the invention relates to a filter holder that comprises a cup that has a bottom that is equipped with an outlet opening, and an annular wall that extends from the bottom up to an upper perimeter that defines an opening that is designed to be mounted on an outlet for hot water under pressure of a coffeemaker, and a dosette support that extends between the annular wall of the cup at a distance from the bottom and comprising perforations.

In the known filter holders, the perforated support is most often formed by a metal plate that has a large number of cylindrical through holes. The holes can have a diameter of several tens of microns if the support is designed to house the grind, for example coffee, directly, which creates a significant pressure drop. When the filter holder is designed to hold a dosette, formed by, for example, a flexible filter paper packet that contains the uncompacted coffee grind, the holes of the dosette support can have a diameter on the order of 1 to 2 mm. However, given the pressure that is exerted on the dosette by the admission of hot water, the support holes are to be adequately spaced from one another so that the support has the necessary mechanical resistance. Consequently, the ratio between the surface area of the holes and the total surface area of the support is low. The pressure drops of the liquid that passes through the dosette and the support are non-negligible. In addition, the flow of the water through the dosette can be disrupted in certain zones that are located opposite a large full surface of the support.

Filter holders that are more particularly designed for flexible dosettes, as described, for example, in the document EP-A-0 904 717, in which the dosette rests on a plate that has radial grooves on its upper face and a single central opening, generally calibrated so as to hold a portion of the infusion upstream and to form a jet downstream from the latter, also exist. Such a support plate makes it possible to collect the infusion immediately downstream from the dosette and to channel the latter to the single opening. However, such a support creates a significant pressure drop, unlike a support through which the infusion passes over the major portion of its surface thanks to perforations that are distributed on the latter.

It will be noted that in the case of flexible dosettes, the problem of the mechanical resistance of the support is more sensitive, because contrary to the rigid dosettes in which the grind is compacted, there is no distribution of the pressure that is exerted at one point of the upper face of the dosette in a larger zone of its lower face. Furthermore, the pressure drops that are created by the filter holder are more sensitive when the coffeemaker produces water at low pressure, on the order of two bar, and not water under high pressure as in most of the espresso-type machines that operate at approximately 15 bar.

This invention has as its object to eliminate the drawbacks mentioned above by producing a filter holder that minimizes the pressure drops while having a good mechanical resistance, and this in particular for a coffeemaker that operates at low pressure with flexible dosettes.

For this purpose, this invention has as its object a filter holder of the above-mentioned type, characterized in that at least one perforation is made in the form of an elongated slot that extends in the plane of said support and that has a suitable width for allowing a free flow of the infusion toward said outlet opening.

By thus forming one or more slots through the support, instead of cylindrical holes, it is noted that it is possible to increase significantly the total surface area of the perforations of the support, without degrading the support function of the dosette and while preserving an adequate mechanical resistance. It seems that each slot has a sufficiently reduced width to form support lines of the dosette that are quite close together, in particular for avoiding a tearing of the filter paper that forms the dosette.

In addition, each slot very significantly limits the full zones of the grid that do not provide structural resistance but that limit the surface area of the perforations. For example, if a series of aligned adjacent holes was being formed, the total surface area of the thus created opening would be less than the surface area of a slot that has a width that is equal to the diameter of the holes and a length that is equal to the sum of the diameters of these holes. This ratio between the surface area of the perforations and the total surface area of the dosette support is all the more advantageous since each slot is very long, i.e., has a very large ratio of length to width.

The slots can be separated by ribs of continuous width and not with narrow zones that are created between two circular holes, which could create weakness points.

In preferred embodiments of the invention, technologists in addition resort to one or the other of the following arrangements:

The dosette support comprises a number of separate annular slots that are arranged in a concentric manner;

The total surface area of the slots of the dosette support represents at least 20% of the total surface area of said support and is preferably equal to approximately 30% of the surface area of said support, so as to reduce the pressure drops while preserving the satisfactory mechanical resistance;

Each slot has a width of between 1 and 3 mm;

Each slot has an elongation of more than 10;

The distance that separates two adjacent slots is at most equal to the width of said adjacent slots;

The dosette support has a peripheral zone that is lacking any slot and in which spaced cylindrical through holes are made;

The dosette support has a lower face on which are formed reinforcement arms that extend radially relative to the center of the support;

The dosette support is formed by a single piece that is cast in synthetic resin, and preferably polyamide, which makes it possible to produce a piece with complex geometry at an acceptable cost.

This invention also relates to a coffeemaker that comprises a generator of hot water under low pressure, on the order of two bar, and an infusion chamber, characterized in that the infusion chamber comprises a filter holder as defined above and is geometrically suitable for housing a flexible dosette.

Other characteristics and advantages of the invention will emerge during the following description of an embodiment, given by way of nonlimiting example, with reference to the accompanying drawings in which.

In the different figures, identical references are maintained to designate identical or similar elements.

Figure 1:
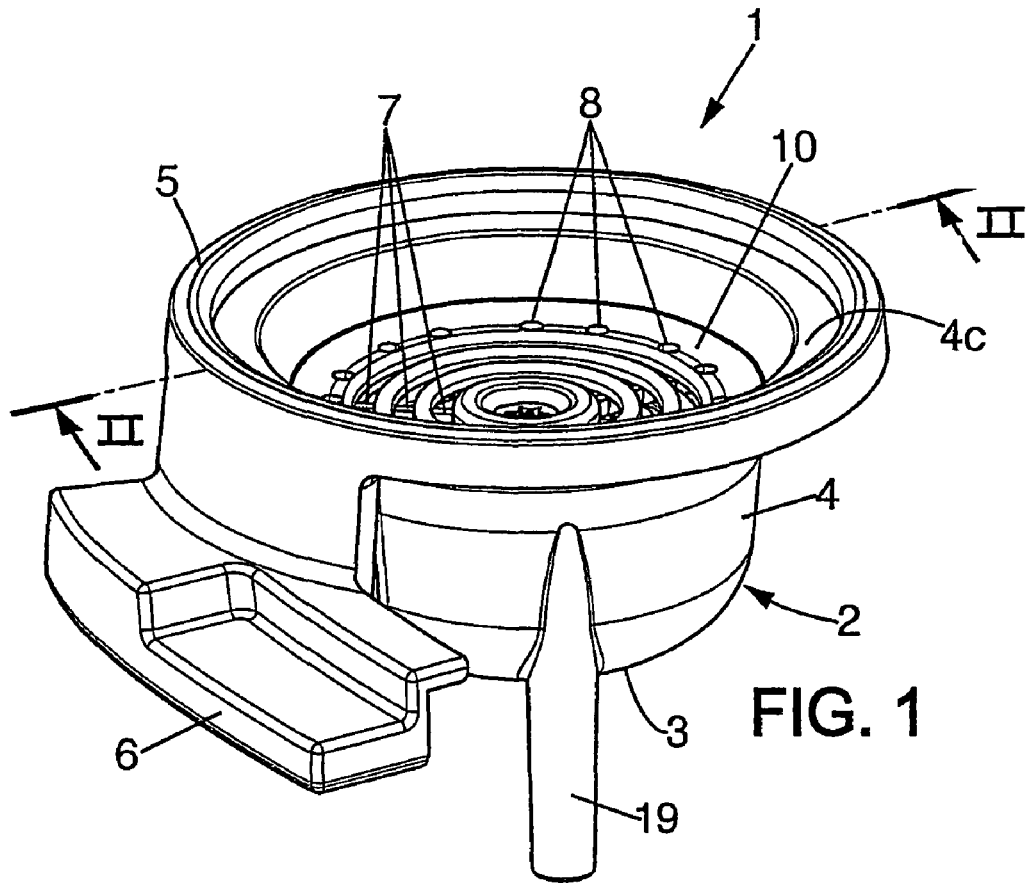
FIG. 1 is a perspective view of a filter holder that comprises a dosette support that is produced according to the invention.

FIG. 1 shows a filter holder 1 that is designed to hold a dosette of the product to be infused, such as coffee, for example. The filter holder 1 comprises a cup 2 that has a bottom 3, an annular wall 4 that overall extends vertically from the bottom 3 to an upper perimeter 5, and a gripping element 6.

The filter holder 1 also comprises a dosette support 10 that extends between the annular wall 4 of the cup 2 so as to cover entirely a section of the inside space that is defined by the annular wall 4.

Figure 2:
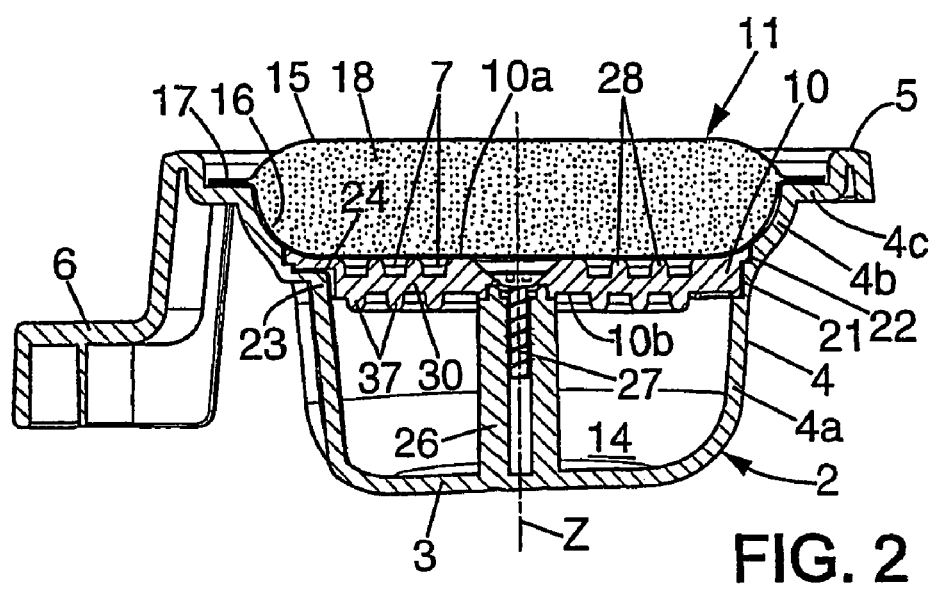
FIG. 2 is a vertical cutaway view along line II-II of FIG. 1 with a dosette that is arranged in the filter holder.

As can be better seen in FIG. 2, the dosette support 10 is located at a distance from the bottom 3 of the cup, such that it defines a lower chamber 14 with the bottom 3 and with a lower part 4a of the annular wall 4. The support 10 is also located at a distance from the upper perimeter 5, such that an upper face 10a of the support defines—with an upper part 4b of the annular wall 4—an open housing space that is designed to house the dosette 11 that is diagrammatically shown in FIG. 2.

The dosette 11, FIG. 2, is a slightly bent, flexible packet, formed by two sheets of filter paper (15, 16) that are attached to one another with a peripheral sealing collar 17. The packet contains a product to be infused 18 that comes in the form of a grind or a powder. The product to be infused 18 is the uncompacted coffee grind in the example shown, but it could be any other product that makes it possible to prepare an infusion, such as, for example, tea, aromatic plants, a chocolate or milk powder, or else a mixture of these products to prepare hot chocolate or cappuccino. Furthermore, it is completely conceivable to use a dosette whose outside jacket would be constituted differently, for example in the form of rigid elements made of plastic combined with filtering elements in the form of cloth or a perforated grid.

The bottom 3 of the cup 2 has a slight slope directed toward an outlet opening that is formed by a flow pipe 19 (FIG. 1). Thus, an infusion that flows freely into the lower chamber 14 is collected and guided toward the outlet pipe 19 into which it flows.

The lower part 4a of the annular wall 4 of the cup has an overall cylindrical shape and comprises a peripheral annular flange 21 against which rests an additional peripheral flange 22 of the dosette support 10. The flange 21 has a projection 23 that is located on the side of the gripping element 6 and that works with a scalloping 24, visible in FIG. 3, made on the periphery 22 of the support 10 so as to index the angular position of the support relative to the cup 2.

As shown in FIG. 2, the dosette support 10 also has a lower face 10b whose central zone rests on a foot 26 that extends along the axis of symmetry Z of the annular wall 4. A screw 27 that is engaged in a threading of the foot 26 shows a head that works with a tapered recess of the upper face 10a of the support 10 to ensure the attachment of the latter to the cup 2.

The upper part 4b of the annular wall 4 of the cup 2 is flared in an arc so as to match the shape of the bent part of the dosette 11 and is extended by a radially outside shoulder 4c against which the sealing collar 17 of the dosette rests, see FIG. 2. The annular wall 4 of the cup 2 ends by the upper perimeter 5 that defines an opening of the dosette holder that is designed to be mounted on an outlet of hot water under pressure of a coffeemaker, coming, for example, in the form of a sprayer.

In the embodiment that is shown, the filter holder 1 is arranged, in a known way, in an infusion chamber that is delimited by two parts of the housing of the coffeemaker, whereby one of the two parts of the housing is mounted in such a way that it can move. During the preparation of an infusion, the two parts of the housing are locked with one another such that the moving part of the housing exerts a pressure on the collar 17 of the dosette 11 by means of a sealing joint. Since the filter holder 1 that is shown is designed to be kept tight against two parts of the housing, it does not comprise a tightening or locking element, and the gripping element 6 comes simply in the form of a tab. However, the filter holder could come in the form of a cup that has radially outside lugs and that is equipped with a sleeve to be mounted directly by a bayonet-type connection under the hot water outlet of a coffeemaker.

As can be seen in FIG. 2, the dosette support 10 has the shape of an essentially flat disk that extends perpendicular to the central axis Z of the cup 2. The peripheral edge of the upper face 10a of the support 10 is slightly raised to form a continuous surface with the tapered part 4b of the cup and to match the shape of the profile of the dosette 11. However, the support 10 could come in a significantly less flat shape, for example a bowl shape that extends over the rounded edge of the dosette 11. Even in this case, however, the support 10 would have a mid-plane that would preferably be essentially parallel to the plane that contains the upper perimeter 5 of the cup 2.

Like most of the grind supports for espresso-type coffeemakers, the dosette support 10 has a certain number of perforations (7, 8), i.e., openings that pass directly through the support from its upper face 10a to its lower face 10b. According to the invention, a portion of these perforations is made in the form of slots 7. In a preferred embodiment, the slots 7 are annular and come in the form of three concentric circles, without a connection between them, which extend along the upper face 10a and the lower face 10b of the support 10, i.e., in the mid-plane of the support 10. The slots 7 extend over a length that is clearly greater than their width, such that it is a matter of elongated slots, whereby the elongation ratio of the slots is preferably greater than 10. Actually, a significant elongation of the slots increases the surface area of the thus produced perforations and consequently increases the passage cross-section of the infusion through the support 10, relative to perforations that would be produced in the form of cylindrical holes with a diameter that is equal to the width of the slot and arranged beside one another over a length that corresponds to the length of the slot. By thus increasing the surface area of the perforations constituted by the slots 7, the pressure drop of the infusion is limited when the latter passes through the dosette support 10 to flow into the lower chamber 14, which is particularly advantageous when the coffeemaker delivers the hot water under a relatively low pressure, on the order of two bar.

For this same purpose of limiting the pressure drops, each slot is to have a minimum width for preventing any manifestation of holding by capillary action or constriction of the flow producing the formation of a jet from the lower face 10b of the support 10. It is considered that a free flow of the infusion is obtained through a slot 7 toward the outlet opening 19 when the slot has a width of at least 0.5 mm in the case of a flexible dosette of standard coffee that is infused under a pressure of approximately two bar and with perforations (7, 8) that have a cumulative surface area that corresponds to at least 20% of the total surface area of the support 10. This minimum width of the slots 7 can, however, vary essentially based on the nature, the pressure and the flow rate of the infusion, or else based on the thickness of the dosette support 10.

Further, it was noted that a perforation in the form of slot 7 effectively supported the filter paper 16 of the dosette 11, i.e., the latter is not deformed excessively, or even torn, after the preparation of an infusion, despite its large unsupported surface, whereas if the same surface is perforated in the form of a cylindrical hole, there is a danger of the dosette deteriorating.

It seems that a slot width of about 2.5 mm, as in the embodiment shown, but which could vary between 1 and 3 mm, offers a good compromise between the requirement of a large passage cross-section and a reliable support of the dosette 11.

The arrangement of the annular slots 7 in the form of concentric circles makes it possible for the latter to occupy a large surface area of the support 10 and to be very long. It will be noted, however, that each slot could also have a polygonal annular shape or else be rectilinear, curved, or even in the shape of a spiral. Separate slots 7 that are arranged next to one another, i.e., that extend parallel to one another such that the full parts 28 that separate two adjacent slots that have a width that is smaller than the width of the adjacent slots 7, so as to minimize the surface area of these full parts, will be preferred, however.

Figure 3:
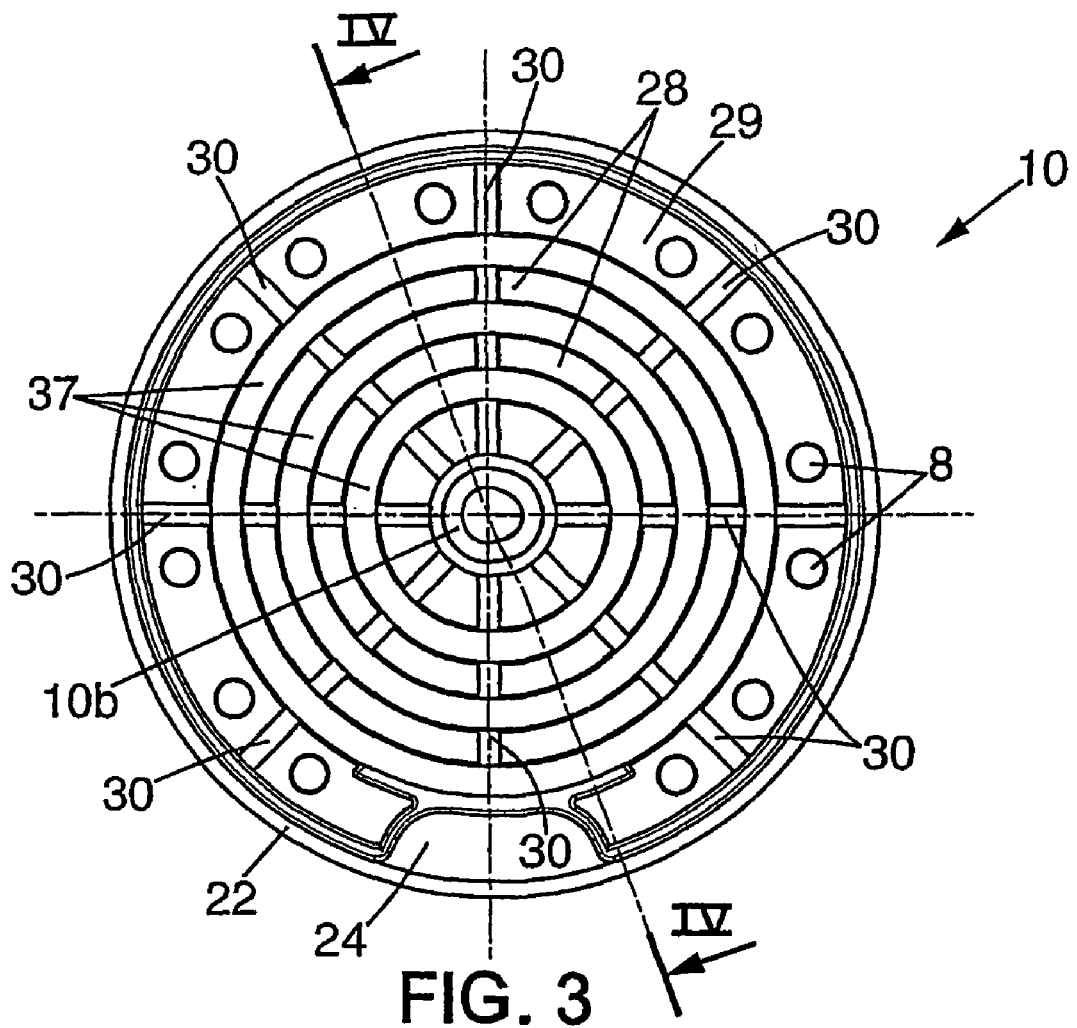
FIG. 3 is an enlarged bottom view of the support of the filter holder shown in FIG. 1.
Figure 4:
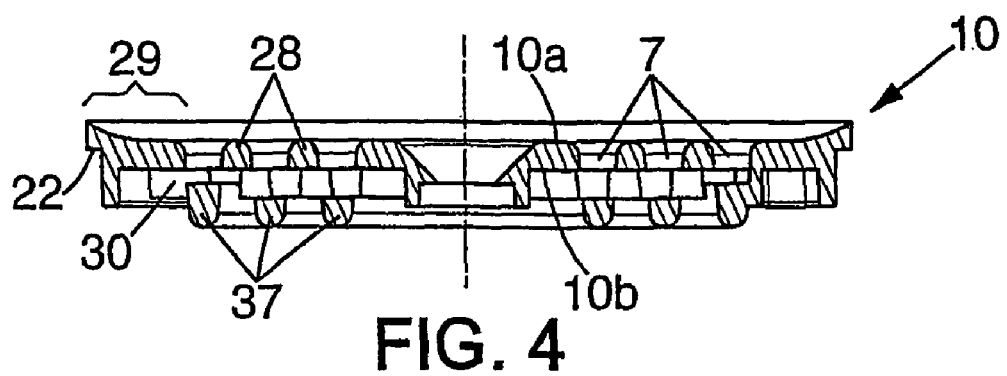
FIG. 4 is a vertical cutaway view along line IV-IV of FIG. 3.

As can be seen in FIG. 3, the annular peripheral zone 29 of the support 10 is lacking any slot but comprises the perforations 8 that are made in the form of cylindrical through holes that therefore also increase the total surface area of the perforations, such that the latter represents about 30% of the surface area of the disk that corresponds to the upper surface area 10*a* of the dosette support. It should be noted that this peripheral zone 29 of the support is generally lacking any perforation in the supports that are provided for flexible dosettes because the peripheral collar of the latter is able to deform and to create a direct passage of the hot water from the outlet of the coffeemaker through the dosette support. It was noted that by adopting cylindrical holes 8 with a diameter of about 2 mm and separated from one another by a distance that is greater than their diameter, this risk was limited.

So as to support the full annular parts 28 that separate the slots 7 and to impart a mechanical resistance to the dosette support 10 that makes it possible to withstand the pressure that is created by the hot water outlet, reinforcement arms 30 are located opposite the lower face 10*b* of the dosette support and, preferably, extend radially relative to the center of the latter.

It will be noted that under the reinforcement arms 30, masking elements 37 that each have a shape that is essentially identical to the corresponding slot 7 are provided. The elements 37 are arranged opposite the slots 7 so as to mask visually the bottom 3 of the cup that can comprise traces of coffee and to limit the possibility of introducing foreign objects into the lower chamber 14 via the slots 7. However, it is important that these masking elements 37 be arranged at a significant distance from the lower face 10*b* of the dosette support and have a reduced width, so as not to reduce by blockage the effective passage cross-section of the perforations (7, 8) of the support 10. In this embodiment, the distance that separates the upper face of the masking elements 37 from the lower face 10*b* of the support is 2 mm, i.e., on the order of magnitude of the width of the slots 7, and the width of the masking elements 37, measured radially, is slightly less than the width of the slots 7, such that these masking elements 37 do not in any way impede the free flow of the infusion toward the outlet of the filter holder.

The dosette support 10, as well as the reinforcement arms 30 and the masking elements 37, are formed by a single piece of cast synthetic resin, which makes it possible to produce a large series of complex pieces of specific shape while limiting the costs thereof. It turns out that the polyamide is a material that is particularly suitable for withstanding both mechanical constraints and temperatures that the dosette support 10 should support.

The filter holder 1 that is described above limits the pressure drops of the infusion when it passes through the latter and therefore makes it possible to obtain a satisfactory flow rate and a satisfactory pressure downstream from the dosette support 10. Thus, it is particularly suited to be arranged in an infusion chamber of a coffeemaker that comprises a generator of hot water under low pressure.

The invention claimed is:

1. Filter holder for a coffeemaker that is designed to house a dosette of the product to be infused, comprising:
   a cup that has a bottom that is equipped with an outlet opening,
   an annular wall that extends from the bottom up to an upper perimeter that defines an opening that is designed to be mounted on an outlet for hot water under pressure of a coffeemaker, and
   a dosette support that extends between the annular wall of the cup at a distance from the bottom of the latter cup and that comprises perforations,
   wherein at least one of the perforations is an elongated slot that extends in a plane of said support and that has a suitable width for allowing a free flow of the infusion toward said outlet opening, and said dosette support has a lower face on which reinforcement arms that extend radially relative to the center of said support are formed.

2. Filter holder according to claim 1, wherein the dosette support comprises a number of separate annular slots that are arranged in a concentric manner.

3. Filter holder according to claim 1, wherein a total surface area of the slots of the dosette support represents at least 20% of a total surface area of said support.

4. Filter holder according to claim 1, wherein each slot has a width of between 1 and 3 mm.

5. Filter holder according to claim 2, wherein the distance that separates two adjacent said slots is at most equal to the width of said adjacent slots.

6. Filter holder according to claim 1, wherein the dosette support has a peripheral zone that is lacking any slot and in which spaced cylindrical through holes are made.

7. Filter holder according to claim 1, wherein the dosette support is formed by a single piece that is cast in synthetic resin.

8. Filter holder according to claim 2, wherein a total surface area of the slots of the dosette support represents at least 20% of a total surface area of said support.

9. Filter holder according to claim 7, wherein the resin is polyamide.

10. Filter holder according to claim 1, wherein a total surface area of the slots of the dosette support represents approximately 30% of a surface area of said support.

11. Filter holder according to claim 2, wherein a total surface area of the slots of the dosette support represents approximately 30% of a surface area of said support.

* * * * *